Dec. 1, 1970   J. H. FOX   3,543,575
SHEAR PIN TESTING DEVICE
Filed Dec. 9, 1968
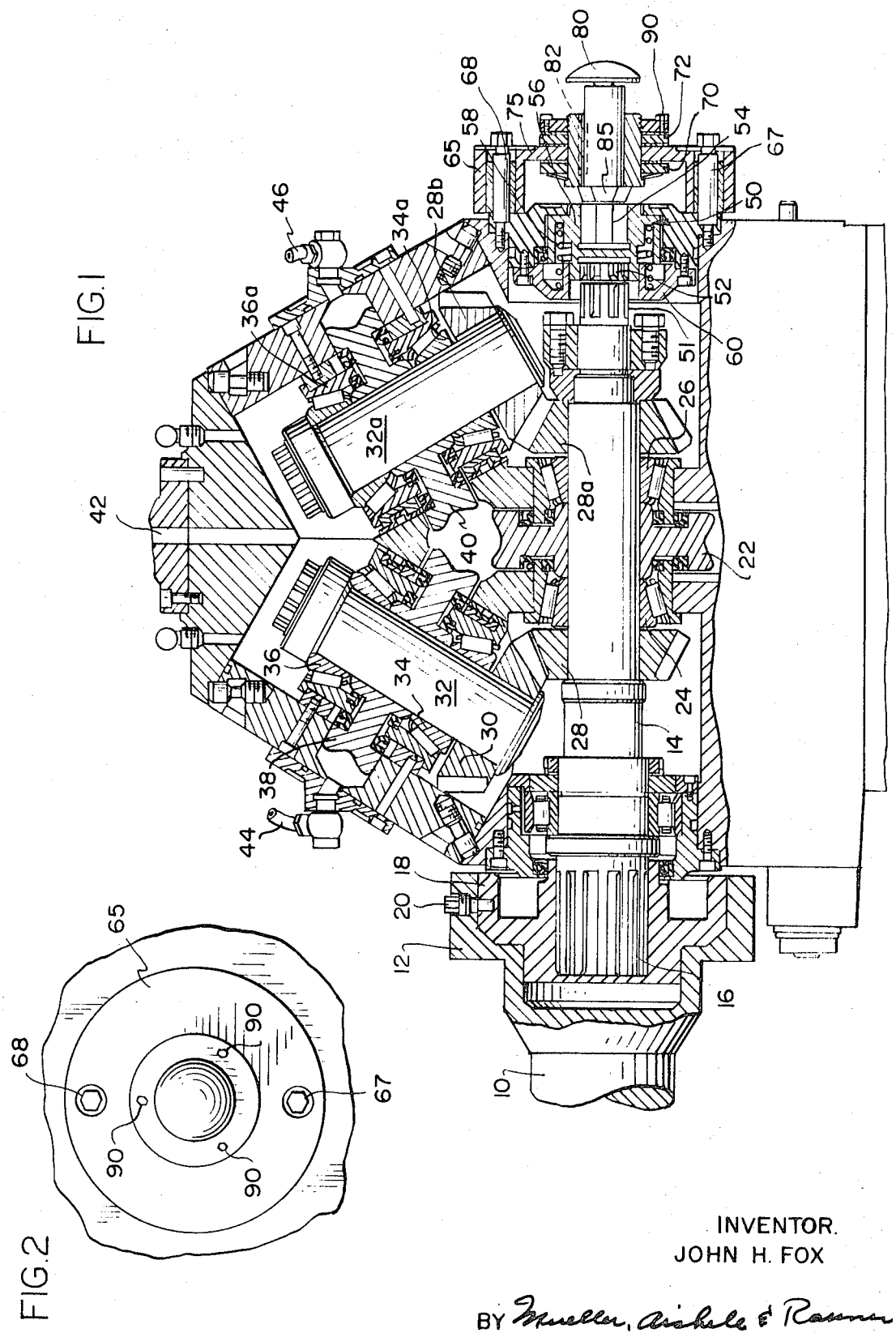
INVENTOR.
JOHN H. FOX
BY *Mueller, Aichele & Rauner*
ATTORNEYS under the ordinary friction drag existing in the splined coupling between the collar 12 and sleeve 18, rotate the drive shaft 14, although the shear pin is broken.

United States Patent Office
3,543,575
Patented Dec. 1, 1970

3,543,575
SHEAR PIN TESTING DEVICE
John H. Fox, Rock Island, Ill., assignor, by mesne assignments, to Nichols-Homeshield, Inc., Elmhurst, Ill., a corporation of Delaware
Filed Dec. 9, 1968, Ser. No. 783,462
Int. Cl. G01l 5/00
U.S. Cl. 73—133                    7 Claims

ABSTRACT OF THE DISCLOSURE

A collar on a drive shaft is connected by a shear pin to a splined sleeve connected to the splined end of a second drive shaft used for operating a single stand in a multi-stand rolling mill. A plunger is keyed to a friction clutch and is actuable to engage a claw coupling with the stand drive shaft. The friction clutch is adjusted to apply a predetermined torque to the drive shaft as it rotates the coupling. If a shear pin is broken the torque applied to the drive shaft by the clutch will prevent it from being rotated by the mill drive shaft.

BACKGROUND OF THE INVENTION

This invention pertains to a testing device and more particularly to a shear pin testing device for a rolling mill stand.

Typically, rolling mills are comprised of a plurality of stands whereby the cross-section of metal stock to be rolled is changed slightly by each stand until the desired cross-section is achieved. In some installations power is transmitted through the mill main drive shaft, which operates a secondary drive system including a plurality of spur gear trains each having a shaft connected to the drive shafts of the individual stands by a coupling secured with a shear pin. In addition to providing the coupling between the secondary drive system and each stand drive shaft, the shear pin also serves as a safety device and breaks if the stand drive shaft becomes overloaded. However, sometimes during the rolling operation it is possible for one of the pins to shear and go undetected, as the stand immediately before and the stand immediately after the stand having the sheared pin both push and pull the stock through the stand, so the stand drive shaft does not have to be in operation. However, on the next start up of the mill, the rolling dies would not be turning, and as the stock was fed to the stand containing the broken shear pin, the stock would stop causing buckling or cobbling in the stands preceding this stand and in turn fracture the shear pins in the same.

It has been proposed to engage a rotatable member with the stand drive shaft, and if it rotates it indicates that the shear pin is intact. However, because of the friction in the coupling between the drive shaft of the intermediate drive system and the drive shaft of the stand, this engaged member can rotate even though the pin is sheared.

SUMMARY OF THE INVENTION

It is an object of this invention to provide improved means for testing the individual stands of a rolling mill to insure that they are operable.

It is another object of this invention to provide a device for testing the individual stands of a continuous rolling mill to insure that the shear pin coupling between the intermediate drive system of the mill and the stand drive shaft is intact.

In one embodiment of this invention, the drive shaft of a continuous rolling mill intermediate drive system is connected to the drive shaft of an individual stand of the mill by a shear pin joining together a collar connected to the intermediate drive shaft and a sleeve which is connected to the stand drive shaft and received within the collar. A claw coupling is mounted to one end of the stand drive shaft and is adapted to be selectively engaged with the drive shaft. A plunger is keyed to a friction clutch that is fastened at the same end of the stand. Pushing the plunger causes it to engage the claw member, and moves it into engagement with the stand drive shaft. The friction clutch applies a torque, which may be adjusted to the stand drive shaft. The torque is sufficient to overcome any friction coupling between the stand drive shaft sleeve and the collar on the intermediate drive system shaft. Therefore, should the shear pin be broken, the coupling between the intermediate drive system and the stand drive shaft will be broken and the clutch will not rotate thereby signifying the failure of the shear pin.

BRIEF DESCRIPTION OF THE DRAWINGS

FIG. 1 is an elevation view in cross-section showing a single stand of a continuous rolling mill and a testing device therefor in accordance with the principles of this invention; and FIG. 2 is a front plan view of the testing device of FIG. 1.

DETAILED DESCRIPTION

Referring to the drawing, FIG. 1 illustrates a single stand of a continuous rolling mill which could be made up, for example, of seventeen stands. The rolling mill receives continuously cast rod stock which it rolls into the desired cross-section. Typically, in a continuous rolling mill of this type, there is a main drive shaft which drives a gear train of a secondary drive system running the entire length of the mill. The secondary drive system supplies power to each of the rolling mill stands.

In FIG. 1, the intermediate drive shaft 10 is connected to the spur gear train (not shown) of the secondary drive system. Integral with this drive shaft 10 is a collar 12. The horizontal drive shaft 14 of the individual rolling mill stand has a splined end 16, which is received in the splined sleeve 18. The collar 12 and the sleeve 18 are connected together in a rotating relationship by the shear pin 20. The vertical roll 22 is keyed directly to the stand drive shaft 14 and rotates therewith. Roller bearings 24 and 26 are mounted on either side of the roller 22 and rotatingly support the shaft 14. Mitre gear 28 is keyed to the shaft 14 and engages with mitre gear 30, which is connected to the roller shaft 32 supported by the bearings 34 and 36. Roller 38 of the stand is keyed to the shaft 32 and rotates therewith as the mitre gear train is operated by shaft 14. The remaining roller 40 is likewise driven by the mitre gear train comprising gears 28a and 28b, which drive roller 32a supported by the roller bearings 34a and 36a.

Lubrication for the machine is provided by an inlet 42 which receives mineral oil for flooding the internal roller bearings and mitre gears. The two fittings 44 and 46 at either side of the stand supply water-soluble oil which serves as a coolant and lubricant for the work rolls 22, 38 and 40.

The shear pin 20 besides providing a connection between the collar 12 and the sleeve 18 also acts as a safety device should the stand drive shaft 14 become overloaded. When this happens, the pin shears separating the intermediate drive shaft 10 from the stand drive shaft 14. If the pin shears during mill operation and the shaft 14 ceases to rotate, the stand in front of this stand and the one next in sequence will push and pull respectively the continuous rod through the stand so that failure of the shear pin may not be realized. However, after the mill is shut down and upon restarting, the continuous rod, when it reaches the stand with the broken shear pin, will stop or buckle causing all of the shear pins in the stands preceding this one to fail resulting in costly repairs.

Accordingly, in order to test the shear pins in each of the stands in the rolling mill, I have invented a unique device. In accordance with the principles of this invention, the end of the stand drive shaft 14 opposite the end coupled to the mill intermediate drive system is splined. A spring biased mating claw 50 is rotatingly connected to the stand. Claw 50 has a splined cylinder 52 which is matched to the splined end 51 of the shaft 14 and engageable therewith. Opposite the splined cylinder is a socket 54. Axial pressure on the portion 56 of claw 50, containing the socket 54, moves the same against the pressure of spring 58, compressing the spring within the mounting bracket portion 60 of claw 50. This moves the splined cylinder 52 into engagement with the splined end 51 of the shaft 14 so that the mating claw 50 including the portion 56 rotates with the shaft 14.

This device in itself is not sufficient to act as a testing device for the shear pin 20, because the friction existing between the collar 12 and the sleeve 18 will permit rotation of the shaft 14, with the mating claw 60 engaged with the splined end 51 of the shaft. In order to overcome this friction in the coupling, a friction clutch assembly 65 is removably mounted to the stand by engaging the same with the pins 67 and 68 connected to the stand. The friction clutch includes first and second faceplates 70 and 72 which are rotatably mounted on either side of the bracket 75 supporting the same. A plunger 80 is keyed at 82 to the clutch and has a hexagon shaped insert 85 which matingly engages the slot 54 in portion 56 of the claw 50.

In operation, to test the shear pin 20 in the stand, the plunger 80 is pressed forward until it is engaged in the slot 54. Continued pressure on the plunger 80 moves the splined cylinder 52 against the pressure of spring 58 into engagement with the splined shaft 51. The rotation of shaft 14 will now be transmitted through the mating claw 50 to the plunger which rotates the faceplates of the friction clutch. This clutch applies a torque to the drive shaft 14, which overcomes any friction force between the sleeve 12 and the collar 18. Therefore, if the shear pin 20 is broken the coupling between the intermediate drive system of the mill and the stand drive shaft 14 will be broken and the clutch will not rotate. Likewise, if the shear pin is not broken the plunger 80 will rotate along with the shaft 14 indicating that the stand is in an operable condition. Upon release of the plunger 80 the spring 65 returns the claw 50 to the normal operating position.

The amount of torque applied to the shaft 14 by the clutch is adjusted by the screws 90 on the face of the clutch. It is desirable that the torque be sufficient to overcome any friction between the sleeve and the collar yet the applied torque should not be great enough to overload the stand drive shaft thereby causing the shear pin to be broken. By having each of the stands fitted with a mating claw, it is necessary to have only one friction clutch and plunger assembly which can be slipped over pins similar to 67 and 68 on each of the stands to operate the claw and apply torque to the stand drive shafts.

What has been described, therefore, is a unique device for reliably testing the shear pin connecting the intermediate drive system of a continuous rolling mill to the individual stand drive shafts.

What is claimed is:

1. In an operating installation having a first rotating member coupled to a second rotating member by a device shearable in response to a predetermined load on the rotating members for protecting the installation, the combination including, apparatus for testing the installation to determine if the shearable device is intact, including in combination, first means selectively engageable with one of said first and second members and being rotatable therewith, and torque applying means operatively coupled to said first means, with said first means being engaged with one of said members, said torque applying means loads down said member, and said member ceases rotating with the device being sheared, and said member continues to rotate with said device being intact.

2. The operating installation of claim 1 wherein said first means includes a claw coupling resiliently engageable with one of said members, and said torque applying means includes a plunger engageable with said claw coupling and a torque control clutch, said clutch being rotatingly connected to said plunger, whereby pushing said plunger engages the same with said claw coupling and moves the combination into engagement with one of said rotating members causing said plunger to rotate with said clutch applying a torque to said rotating member to load down the same.

3. The operating installation of claim 2 wherein said clutch is adjustable to vary the amount of torque applied to said member.

4. In a rolling mill having a plurality of stands and a drive system including a shaft having a collar on the drive end that is connected to a sleeve on a stand drive shaft by a shear pin for operating the same, a system for testing the stand to insure that the shear pin is intact, including in combination, rotating means for selectively engaging the stand drive shaft, and means operatively connected to said rotating means for applying a predetermined torque to the stand drive shaft with said rotating means being engaged therewith, so the stand drive shaft ceases rotating with said shear pin being broken.

5. The rolling mill of claim 4 with the stand drive shaft having a splined end, and wherein said rotating means includes a claw selectively engageable with the splined end and rotatable therewith.

6. The rolling mill of claim 4 wherein said means for applying a predetermined torque includes actuating means coupled to said rotating means and being operable for engaging the same with the stand drive shaft, and a friction clutch connected to said actuating means, whereby said friction clutch applies a torque to said stand drive shaft with said rotating means being engaged thereto thereby applying a force to the drive shaft coupling the stand drive shaft to the mill drive system for testing the same.

7. The rolling mill of claim 6 wherein said friction clutch is adjustable to vary the amount of torque applied to the stand drive shaft.

References Cited

UNITED STATES PATENTS

| 1,129,903 | 3/1915 | Reilly | 73—133 |
| 2,022,007 | 11/1935 | Moore | 318—475 |
| 2,652,914 | 9/1953 | Christensen | 340—271 XR |
| 2,909,922 | 10/1959 | Haman | 73—135 |
| 3,103,004 | 9/1963 | Murray | 340—271 |
| 3,299,697 | 1/1967 | Sparling | 73—133 XR |

CHARLES A. RUEHL, Primary Examiner

U.S. Cl. X.R.

72—31